(12) United States Patent
Sevindik

(10) Patent No.: US 11,997,662 B2
(45) Date of Patent: May 28, 2024

(54) COMMUNICATION MANAGEMENT SYSTEM AND WIRELESS BANDWIDTH SWAPPING

(71) Applicant: Charter Communications Operating, LLC, St. Louis, MO (US)

(72) Inventor: Volkan Sevindik, Reston, VA (US)

(73) Assignee: Charter Communications Operating, LLC, St. Louis, MO (US)

(*) Notice: Subject to any disclaimer, the term of this patent is extended or adjusted under 35 U.S.C. 154(b) by 321 days.

(21) Appl. No.: 17/363,461

(22) Filed: Jun. 30, 2021

(65) Prior Publication Data

US 2023/0007654 A1    Jan. 5, 2023

(51) Int. Cl.
*H04W 72/04* (2023.01)
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC . H04W 16/14; H04W 24/02; H04W 72/0453; H04W 72/23
USPC ...................................................... 455/509
See application file for complete search history.

(56) References Cited

U.S. PATENT DOCUMENTS

| | | | | |
|---|---|---|---|---|
| 9,026,157 B1* | 5/2015 | Falk | ...................... | H04W 24/02 455/501 |
| 11,558,081 B1* | 1/2023 | Padaki | ................. | H04B 1/7176 |
| 2011/0250917 A1* | 10/2011 | Zhu | ....................... | H04W 24/02 455/509 |
| 2018/0103404 A1* | 4/2018 | Emmanuel | .......... | H04L 43/0888 |
| 2018/0132241 A1* | 5/2018 | Gayde | ................. | H04B 17/318 |
| 2018/0295633 A1* | 10/2018 | Abdelmonem | ....... | H04B 1/7097 |
| 2018/0338315 A1* | 11/2018 | Chen | ..................... | H04W 48/20 |
| 2019/0158413 A1* | 5/2019 | Patil | .................... | H04W 28/0252 |
| 2021/0127346 A1* | 4/2021 | Hmimy | ................ | H04W 24/02 |
| 2021/0289513 A1* | 9/2021 | Hafeez | ............. | H04W 72/0453 |
| 2022/0070678 A1* | 3/2022 | Singh | .................... | H04W 16/14 |
| 2022/0386316 A1* | 12/2022 | Vaidya | .................. | H04W 72/56 |

* cited by examiner

*Primary Examiner* — Tan H Trinh
(74) *Attorney, Agent, or Firm* — Armis IP Law, LLC

(57) ABSTRACT

A wireless network environment includes a communication management resource that manages allocation of wireless channels in a network environment. The communication management resource assigns a first wireless channel for use by first wireless communication equipment in a network environment. In response to receiving a request to swap the first wireless channel for a different wireless channel, the communication management resource allocates a second wireless channel as a swap for the first wireless channel. In furtherance of the swap, the communication management resource then notifies the first wireless communication equipment to use the second wireless channel as a substitute to the first wireless channel.

38 Claims, 15 Drawing Sheets

SWAP INFO. 144

WNSP 171 ......... P.A. 177 ............ WCH#5 ......... 191

WNSP 172 ......... P.A. 177 ............ WCH#4 ......... 192

SWAP INFO. 944

WNSP 171 ......... P.A. 177 ............. WCH#1 ............ 891
WNSP 172 ......... P.A. 177 ............. WCH#9 ............ 892
...

FIG. 9

```
SWAP
INFO.
1244
WNSP 171 ...... P.A. 177 ...... WCH#1 ......  [1191]
WNSP 171 ...... P.A. 177 ...... WCH#2 ......
WNSP 172 ...... P.A. 177 ...... WCH#8 ......  [1192]
WNSP 172 ...... P.A. 177 ...... WCH#9 ......
• • •
```

FIG. 12

COMMUNICATION MANAGEMENT SYSTEM AND WIRELESS BANDWIDTH SWAPPING

BACKGROUND

Conventional wireless networks typically include one or more wireless base stations to provide mobile communication devices access to a remote network such as the Internet. One type of wireless base station is a so-called CBSD (Citizen Broadband Radio Service Device). Such a device uses a wireless channel allocated from a CBRS (Citizens Band Radio Service) band to support communications with one or more mobile communication devices.

Typically, a so-called SAS (Spectrum Access Service) in a CBRS network allocates one or more wireless channels to a CBSD (such as a wireless base station) to support communications with respective user equipment such as one or more mobile communication devices. Each base station can be configured to communicate with the SAS to receive notification of the one or more wireless channels allocated for its use. Controlled allocation of wireless channels by the spectrum access system helps to prevent interference and increase spectrum use.

There are multiple different types of wireless channels in a conventional CBRS band. For example, portions of CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use of one or more allocated wireless channels from the CBRS band. For example, when no incumbent user (e.g., Government authority) requires use of the channels, the licensed entities are able to freely use the PAL wireless channels in respective one or more predetermined geographical regions without interference by other users (such as lower priority GAA users). General authorized access (GAA) users are able to use the band without a license when and where available.

Subsequent to allocation, a respective wireless base station then uses the allocated channels to provide one or more communication devices access to a remote network such as the Internet.

Note further that, according to conventional techniques, a portion of spectrum comprising 10 MHz channels are available in areas (such as counties) in the 3550-3650 MHz frequency range in the CBRS band. Up to 7 licenses will be awarded in each county. Each entity can buy rights for up to 4 licenses. The exact frequency range associated with a respective license is not guaranteed because it can change due to incumbent activity. In certain instances, a spectrum access system (SAS) will determine a primary and a secondary channel allocation for so-called PAL users.

It may be further noted that there are certain rules (such as § 96.25) that a SAS must follow in order to allocate channels to corresponding PAL users. For example, Part 96 Rules: (b)(1)(i). Contiguous geographic areas: A SAS must assign geographically contiguous PALs held by the same Priority Access Licensee to the same channels in each geographic area, to the extent feasible. The SAS may temporarily reassign individual PALs held by the same Priority Access Licensee to different channels, so that geographical contiguity is temporarily not maintained, to the extent necessary to protect Incumbent Users or if necessary to perform its required functions under subpart F of this part, (b)(2)(i). Contiguous channels: A SAS must assign multiple channels held by the same Priority Access Licensee to contiguous channels in the same License Area, to the extent feasible.

In certain instances, the SAS may temporarily reassign individual PALs to non-contiguous channels to the extent necessary to protect Incumbent users or, if necessary, to perform its required functions under subpart F.

All PAL channels are not necessarily created equal. For example, some PAL channels may be subject to incumbent protection (e.g., co-channel FSS in 3625-3650 MHz). Band edge channels in the CBRS spectrum may require reduced UE transmission power to meet Federal Communication Commission (FCC) Out of Band Emission (OOBE) requirements.

BRIEF DESCRIPTION OF EMBODIMENTS

There are deficiencies associated with allocation of wireless channels in wireless network environment. For example, as previously discussed, PAL wireless channels are auctioned to highest bidders. Unfortunately, one or more wireless channel assigned to a respective entity may not be the most desirable wireless channels within an available spectrum of wireless channels for a particular entity.

Embodiments herein provide novel ways of supporting improved allocation of wireless communications to one or more communication devices in a network environment.

More specifically, a wireless network environment includes one or more communication management resources that controls allocation of wireless channels in a network environment. A communication management resource initially assigns a first wireless channel for use by first wireless communication equipment in a network environment. In response to receiving a request to swap the first wireless channel for a different wireless channel, the communication management resource allocates (assigns) a second wireless channel as a swap for the first wireless channel. The communication management resource then notifies the first wireless communication equipment to use the second wireless channel as a substitute to the first wireless channel.

A swap request can be received from any suitable resource. In one nonlimiting example embodiment, the communication management resource receives the swap request from the first wireless communication equipment. Additionally, or alternatively, the communication management resource receives the swap request from a wireless network service provider overseeing operation of the first wireless communication equipment.

In still further example embodiments, the communication management resource provides the first wireless communication equipment an evaluation timeframe in which to evaluate use of the second wireless channel in a particular region. This ensures that the allocated second wireless channel (substitute channel) performs at a satisfactory level to the wireless network service provider giving up the first wireless channel.

In one embodiment, in response to receiving input indicating to cancel the requested swap as a result of evaluating the second wireless channel, the communication management resource revokes use of the second wireless channel and provides notice to the first wireless communication equipment to use the first wireless channel again.

Alternatively, in response to receiving input indicating to accept the swap as a result of evaluating the second wireless channel, the communication management resource provides notice to the first wireless communication equipment to continue use of the first wireless channel.

In further example embodiments, the communication management resource initially assigns, prior to the swap, the second wireless channel for use by second wireless communication equipment in the network environment. In response to receiving a request to swap the second wireless channel for a different wireless channel, the communication management resource allocates the first wireless channel to the second wireless communication equipment as a swap for the second wireless channel. The communication management resource notifies the second wireless communication equipment to use the first wireless channel as a substitute to the second wireless channel.

In yet further example embodiments, the first wireless communication equipment is operated by a first wireless network service provider granted a license to the first wireless channel; and the second wireless communication equipment is operated by a second wireless network service provider granted a license to the second wireless channel.

Further embodiments herein include, via the communication management resource, identifying a geographical region in which the first wireless channel is initially assigned for use by the first wireless communication equipment. The communication management resource uses geographical region information at least in part to map the first request (to swap the first wireless channel with the second wireless channel) to a second swap request, the second swap request requesting a swap of the second wireless channel with a different wireless channel in the same geographical region.

As previously discussed, a swap request can be configured to include criteria indicating desired attributes of a wireless channel desired by the entity requesting the swap. In one embodiment, a respective swap request specifies frequency (magnitude) attributes of the different wireless channel being requested for use. In such an instance, in one embodiment, the request to swap the first wireless channel indicates a desire to swap the first wireless channel with a wireless channel of a higher carrier frequency than the original assigned first wireless channel. To satisfy the request, the communication management resource allocates the second wireless channel, which has a higher carrier frequency than the first wireless channel.

Yet further embodiments herein include, via the communication management resource, transmitting a wireless communication over a wireless communication link to the first wireless communication equipment. The wireless communication notifies the first wireless communication equipment to use the second wireless channel as a substitute wireless channel.

Any of one or more communication management resources (such as allocation management resources) as discussed herein can be configured to keep track of a pool of candidate wireless network service providers and corresponding respective requests associated with a possible wireless channel swap. For example, in one embodiment, a communication management resource determines a set of candidate wireless channels in which to swap the first wireless channel based on a location in which the first wireless channel is licensed for use by the first wireless communication equipment. The communication management resource selects the second wireless channel from the set as a swap for the first wireless channel.

As previously discussed, each swap request can be accompanied by criteria indicating attributes of a desired wireless channel. For example, in one embodiment, the communication management resource receives a first swap request from a first wireless network service provider to swap a first wireless channel for a different wireless channel. The first swap request specifies desired attributes of the different wireless channel requested by the first wireless network service provider. Prior to performing the requested swap, the communication management resource receives a second swap request from a second wireless network service provider to swap a second wireless channel for a different wireless channel. The second swap request specifies desired attributes of the different wireless channel desired by the second wireless network service provider. The communication management resource compares the received swap criteria associated with the first swap request and the second swap request to determine whether to perform the swap. Execution of the swap depends on satisfying criteria associated with each of the respective swap requests.

Additional details of supporting wireless channel swaps are further discussed herein.

Embodiments herein are useful over conventional techniques. For example, swapping of wireless channels on an as-needed basis provides better use of the respective limited available wireless spectrum because each of the different wireless network service providers are able to swap undesirable wireless channels for more desirable wireless channels.

Note that any of the resources as discussed herein can include one or more computerized devices, communication management resources, communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and enhanced monitoring and reporting in a network environment. The instructions, when executed by computer processor hardware, cause the computer processor hardware (such as one or more co-located or disparately processor devices or hardware) to: assign a first wireless channel for use by first wireless communication equipment in a network environment; in response to receiving a request to swap the first wireless channel for a different wireless channel, allocating a second wireless channel as a swap for the first wireless channel; and notifying the first wireless communication equipment to use the second wireless channel as a substitute to the first wireless channel.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 4 is an example diagram illustrating swap information according to embodiments herein.

FIG. 9 is an example diagram illustrating swap information according to embodiments herein.

FIG. 12 is an example diagram illustrating swap information according to embodiments herein.

Figure 1:
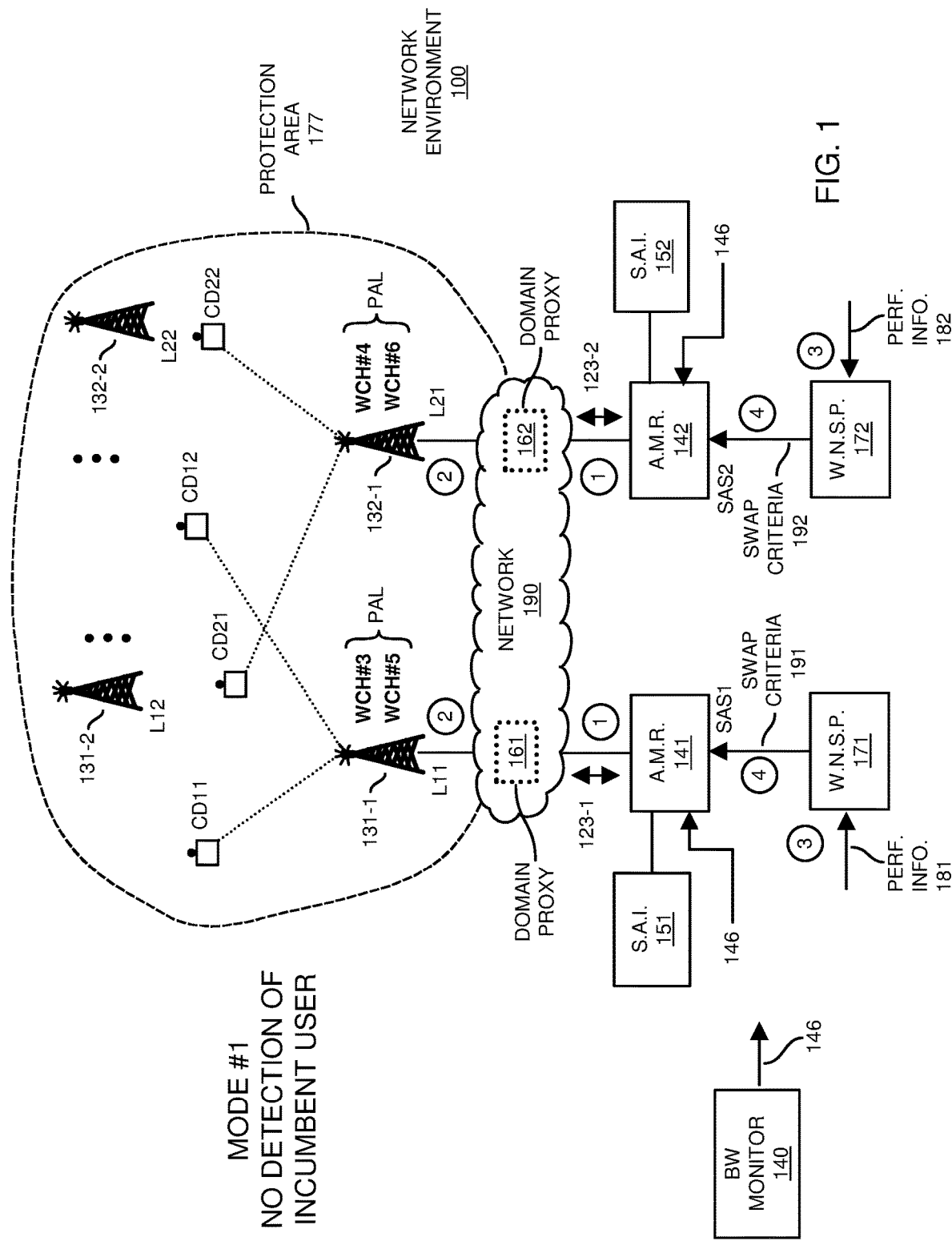
FIG. 1 is an example diagram illustrating a communication network environment of wireless stations assigned use of wireless channels according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A wireless network environment includes a communication management resource that manages allocation of wireless channels in a network environment. The communication management resource assigns a first wireless channel for use by first wireless communication equipment in a network environment. In response to receiving a request to swap the first wireless channel for a different wireless channel, the communication management resource allocates a second wireless channel as a swap for the first wireless channel. In furtherance of implementing the swap, the communication management resource then notifies the first wireless communication equipment to use the second wireless channel as a substitute to the first wireless channel.

Now, more specifically, with reference to the drawings, FIG. 1 is an example diagram illustrating a communication network and swapping of wireless channels according to embodiments herein.

As shown in this example embodiment, network environment 100 includes bandwidth monitor 140, allocation management resource 141 (such as communication management resource, spectrum access system SAS1, etc.), allocation management resource 142 (such as spectrum communication management resource, access system SAS2, etc.), wireless stations 131 (namely, wireless station 131-1, wireless station 131-2, . . . ), wireless stations 132 (namely, wireless station 132-1, wireless station 132-2, . . . ), communication devices CD11, CD12, . . . , communication devices CD21, CD22, . . . , and network 190 (such as including the Internet, wireless infrastructure, etc.).

In one embodiment, the network 190 includes one or more domain proxies 161, 162, etc., to facilitate communications between the allocation management resources and the wireless base stations.

For example, the wireless stations 131 can be configured to communicate through the domain proxy 161 to the allocation management resource 141; the allocation management resource 141 can be configured to communicate through the domain proxy 161 to the wireless stations 131. Additionally, the wireless stations 132 can be configured to communicate through the domain proxy 162 to the allocation management resource 142; the allocation management resource 142 can be configured to communicate through the domain proxy 162 to the wireless stations 132.

Note that each of the resources (such as wireless stations, communication devices, allocation management resources, spectrum monitor, spectrum manager, etc.) in network environment 100 can be configured to include appropriate hardware, software, or combination of hardware and software to carry out respective operations as discussed herein.

More specifically, bandwidth monitor 140 can be configured as bandwidth monitor hardware, bandwidth monitor software, or a combination of bandwidth monitor hardware and bandwidth monitor software; allocation management resource 141 can be configured as allocation management hardware, allocation management software, or a combination of allocation management hardware and allocation management software; allocation management resource 142 can be configured as allocation management hardware, allocation management software, or a combination of allocation management hardware and allocation management software; wireless station 131-1 can be configured as wireless station hardware, wireless station software, or a combination of wireless station hardware and wireless station software; wireless station 132-1 can be configured as wireless station hardware, wireless station software, or a combination of wireless station hardware and wireless station software; and so on.

Note that the allocation management resources as discussed herein can be implemented in any suitable manner. For example, in one embodiment, the allocation management resource 141 and the second allocation management resource 142 (a.k.a., communication management resource) can be operated by different entities and can be disparately located with respect to each other. Alternatively, the allocation management resource 141 and allocation management resource 142 represent a single spectrum access system providing management in a manner as discussed herein. Thus, swapping as discussed herein can be achieved via a single allocation management resource or multiple allocation management resources that collectively manage allocation of wireless channels.

Each communication device (such as CD11, CD12, etc.) is mobile or stationary with respect to a wireless station providing it access to network 190. In one embodiment, network 190 includes the Internet, mobile phone network, etc.

As further shown, wireless station 131-1 (such as operated by a first wireless network service provider/operator) is disposed at location L11 providing communication devices CD11, CD12, etc., access to network 190; wireless station 131-2 (such as operated by the first wireless network service provider/operator) is disposed at location L12, and so on.

Wireless station 132-1 (such as operated by a second wireless network service provider/operator) is disposed at location L21 providing communication devices CD21, CD22, etc., access to network 190; wireless station 132-2 (such as operated by the second wireless network service provider/operator) is disposed at location L22, and so on.

In one embodiment, the one or more wireless base stations operate in a so-called protection area 177 (such as a PAL Protection Area) in which the allocation management resource 141, allocation management resource 142, etc., protect the PAL equipment users and corresponding use of allocated licensed wireless channels amongst each other.

As further discussed herein, protected use of allocated wireless bandwidth (such as one or more wireless channels) includes, when possible, operating in a manner to reduce a likelihood that any PAL users (licensed users such as wireless base stations 131) in (or even outside of) the protection area 177 experience wireless interference from other wireless stations 132 (especially non-licensed users) also operating in the wireless network environment.

In this example embodiment, despite the implementation of protection area 177, note that an incumbent user (first-priority tier 1 user) has highest priority rights to use respective wireless channels.

For example, as its name suggests, the bandwidth monitor 140 (such as an ESC or Environmental Sensing Capability) monitors for use of the wireless channels 1-10 (or other channels) by a respective one or more incumbent entity. If the bandwidth monitor 140 detects use of one or more wireless channels by a higher priority user, via signal 146, the bandwidth monitor 140 notifies the allocation management resources 141 and 142 of this condition. In response to detecting the condition, the allocation management resources 141 and 142, in turn, notify (such as immediately or within a short timeframe such as a few minutes) the wireless stations (and corresponding wireless network service providers) to discontinue use of such wireless channels.

In one embodiment, each of the allocation management resources individually or collectively keeps track of a respective location of each of the wireless stations and allocates wireless channels such that two or more wireless stations implementing wireless communications do not interfere with each other. For example, in one embodiment, in furtherance of providing protected use of allocated bandwidth, the allocation management resources allocate different wireless channels to wireless stations that are in the same location or geographical region.

During further operation, note that the bandwidth manager 130 initially produces spectrum allocation information 151 indicating assignment of bandwidth such as determined from results of a bandwidth auction in which operators pay license fees for use of wireless channels 1-10. An example of such bandwidth and partitioning is shown in FIG. 2.

Figure 2:
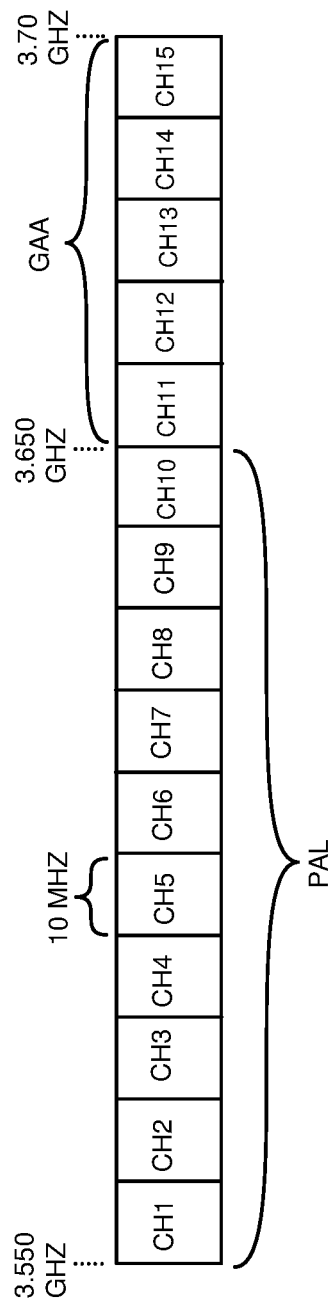
FIG. 2 is an example diagram illustrating allocation of CBRS or other suitable bandwidth to support communications in a network environment according to embodiments herein.

FIG. 2 is an example diagram illustrating assignment, allocation, and use of available wireless channels during non-detection of an incumbent entity according to embodiments herein.

As previously discussed, the wireless stations in network environment 100 can be operated by any number of multiple different service providers. For example, in one embodiment, the first wireless stations 131-1, 131-2, etc., are operated by a first wireless network service provider (second-priority tier 2 user or PAL user); assume in this example embodiment that the first wireless network service provider has a license (such as via paying a license fee) to use the first wireless spectrum such as wireless channels such as wireless channels #3 and #5.

In one embodiment, the second wireless stations 132-1, 132-2, etc., are operated by a second wireless network service provider (PAL user); the second wireless network service provider being a licensed user of the second spectrum such as wireless channels #4 and #6.

Licensed users (wireless network service providers and corresponding wireless stations) are assigned a higher priority to use wireless channels 1-10 (in the licensed wireless channel band) than non-licensed users.

Referring again to FIG. 1, in this example embodiment, as shown via spectrum allocation information 151, the wireless channel 3 and 5 are assigned for use by the first wireless network service provider operating the equipment including wireless base stations 131. Spectrum allocation information 151 indicates that wireless channels 4 and 6 are assigned for use by the second wireless network service provider operating the equipment including wireless base stations 132.

In one embodiment, a bandwidth manager distributes the spectrum allocation information 151, spectrum allocation information 152, etc., to the allocation management resource 141 (such as SAS1) and allocation management resource 142 (such as SAS2). The spectrum allocation information indicates assignment of wireless channels to different wireless network service providers. Thus, the allocation management resources are made aware of the wireless channels assigned to the different wireless network service providers.

In this example embodiment, the allocation management resources allocate use of the wireless bandwidth in accordance with the spectrum allocation information.

For example, each of wireless base station 131-1, wireless base station 131-2, etc., initially registers with the allocation management resource 141 for use of wireless channels. As previously discussed, because no incumbent entity is present, the allocation management resource 141 allocates use of wireless channels 3 and 5 to the wireless base stations 131.

Note that, in one embodiment, as previously discussed, the network 190 includes a domain proxy 161 through which the wireless base stations 131 communicate with the allocation management resource 141. In a reverse direction, the allocation management resource 141 communicates through the domain proxy 161 to the wireless base stations 131. Alternatively, note that the wireless base stations 131 and the allocation management resource 141 transmit communications directly to each other without use of the domain proxy 161 as an intermediary resource.

Additionally, each of wireless base station 132-1, wireless base station 132-2, etc., operated by the second wireless network service provider registers with the allocation management resource 142 for use of wireless channels. Because no incumbent entity is present, the allocation management resource 142 allocates use of wireless channels 4 and 6 to the wireless base stations 132.

In one embodiment, the network 190 includes domain proxy 162 through which the wireless base stations 132 communicate with the allocation management resource 142. In a reverse direction, the allocation management resource 142 communicates through the domain proxy 162 to the wireless base stations 132. Alternatively, the wireless base stations 132 and the allocation management resource 142 transmit communications directly to each other without use of the domain proxy 162 as an intermediary communication resource.

Further in this example embodiment, an incumbent user/entity (such as a naval vessel implementing RADAR use of one or more wireless channels) is a first-priority tier 1 user in the priority hierarchy, the PAL users are second-priority tier 2 users in the priority hierarchy, and the GAA users are third-priority tier 3 users in the priority hierarchy. In the hierarchy, the incumbent users have highest priority access rights; the PAL users have second highest priority access rights; the GAA users have the lowest priority access rights.

As previously discussed, upon detection of a respective incumbent user using any of the wireless channels, the bandwidth monitor 140 notifies the one or more allocation management resources to discontinue use of the wireless channels.

Assume in this example embodiment that, in processing operation #1, the wireless stations register with a respective allocation management resource. The allocation management resource 141 assigns wireless stations 131 use of the wireless channels 3 and 5. The allocation management resource 141 assigns wireless stations 132 use of the wireless channels 4 and 6.

In processing operation #2, the wireless stations 131 use wireless channels 3 and 5 to communicate with one or more communication devices CD11, CD12, etc. The wireless stations 132 use wireless channels 4 and 6 to communicate with one or more communication devices CD21, CD22, etc.

In further example embodiments, in processing operation #3, the wireless network service provider 171 operating wireless stations 131 receives performance information 181 indicating a performance associated with use of wireless channels 3 and 5. The wireless network service provider 171 operating wireless stations 131 receives performance information 182 indicating a performance associated with use of wireless channels 4 and 6.

Assume in this example embodiment that each of wireless network service providers would like a pair of wireless channels that are contiguous in the available wireless spectrum. For example, assume that the performance information 181 indicates that wireless channels 3 and 5 do not provide a level of quality (such as bit transmission rate) above a threshold value. In such an instance, the wireless network service provider 171 produces swap criteria 191 requesting a contiguous set of wireless channels such as wireless channels 3 and 4, 4 and 5, 5 and 6, and so on. In one embodiment, the swap criteria 181 also indicates that wireless channels 3 and 5 are available for the swap.

Further assume that the performance information 182 indicates that wireless channels 4 and 6 do not provide a level of quality (such as bit transmission rate) above a threshold value. In such an instance, the wireless network service provider 171 produces swap criteria 192 requesting a contiguous set of wireless channels such as wireless channels 3 and 4, 4 and 5, 5 and 6, and so on. In one embodiment, the swap criteria 192 also indicates that wireless channels 4 and 6 are available for the swap.

In processing operation #4, the wireless network service provider 171 communicates the swap criteria 191 (swap request) to the allocation management resource 141; the wireless network service provider 172 communicates the swap criteria 192 (and request) to the allocation management resource 142.

Figure 3:
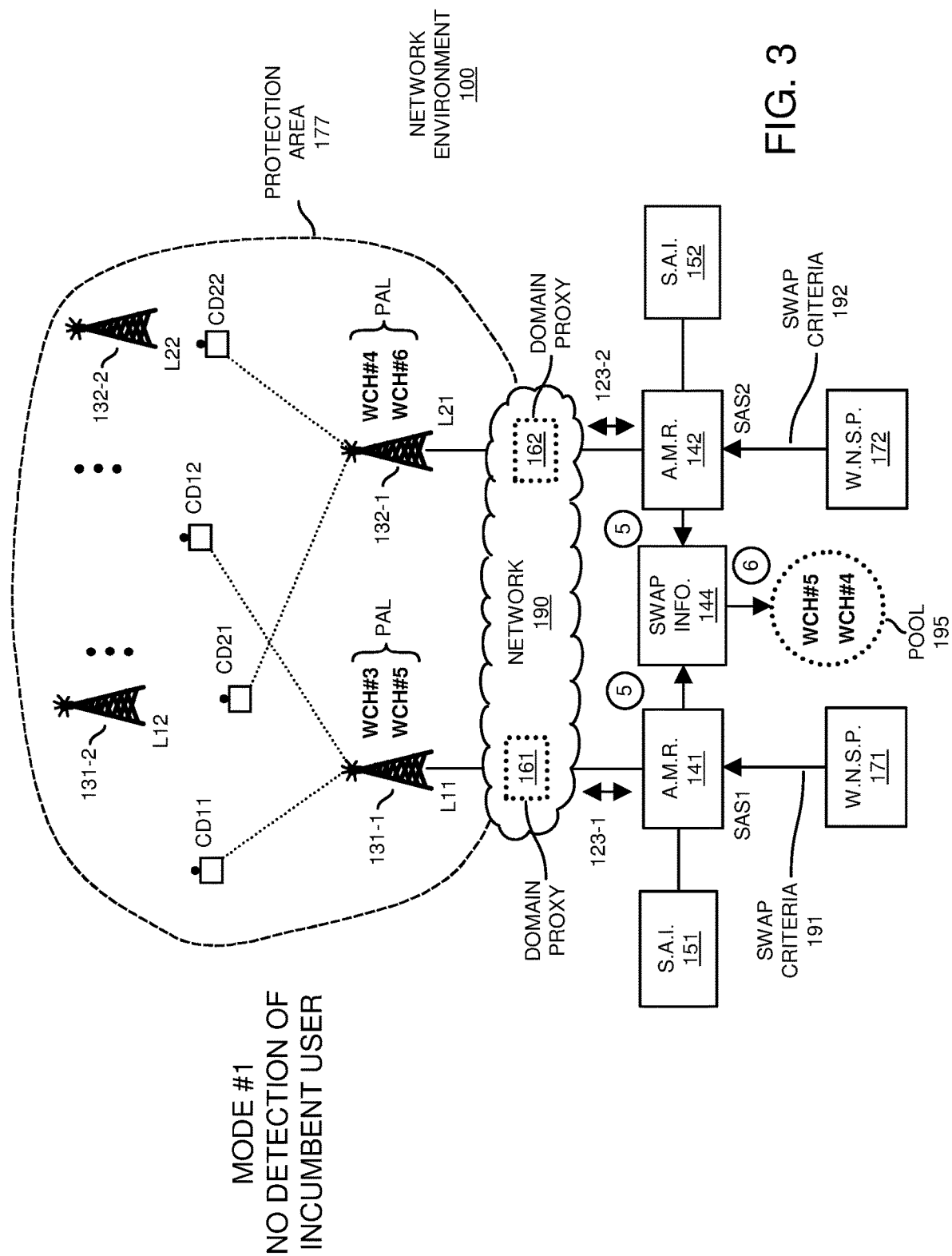
FIG. 3 is an example diagram illustrating tracking of requested wireless channel swaps according to embodiments herein.

FIG. 3 is an example diagram illustrating tracking of requested wireless channel swaps according to embodiments herein.

In processing operation #5, the allocation management resource 141 and the allocation management resource 142 collectively produce swap information 144. An example of swap information 144 is shown in FIG. 4.

FIG. 4 is an example diagram illustrating swap information according to embodiments herein.

In this example embodiment, one or more of the allocation management resources produce and keep track of swap information 144 based on the received swap criteria 191, 192, etc.

For example, in one embodiment, swap information 144 includes registration of the requested swaps such as an identity of a wireless network service provider (171, 172, etc.) requesting a swap, a corresponding geographical region (such as protection area 177) to which the wireless channels are licensed for use, the wireless channels available for swap, swap criteria 191, 192, etc.

The swap information 144 serves as a basis in which the allocation management resources attempt to negotiate a swap of one or more wireless channels with one or more other allocation management resources.

Referring again to FIG. 3, the swap information 144 defines a pool of candidate wireless channels potentially available for swap if respective swap criteria is met for both entities participating in a respective swap.

In this example embodiment, the wireless channels 3, 4, 5, and 6 are all candidate wireless channels in pool 195 for a possible swap in accordance with the respective received swap criteria.

Figure 5:
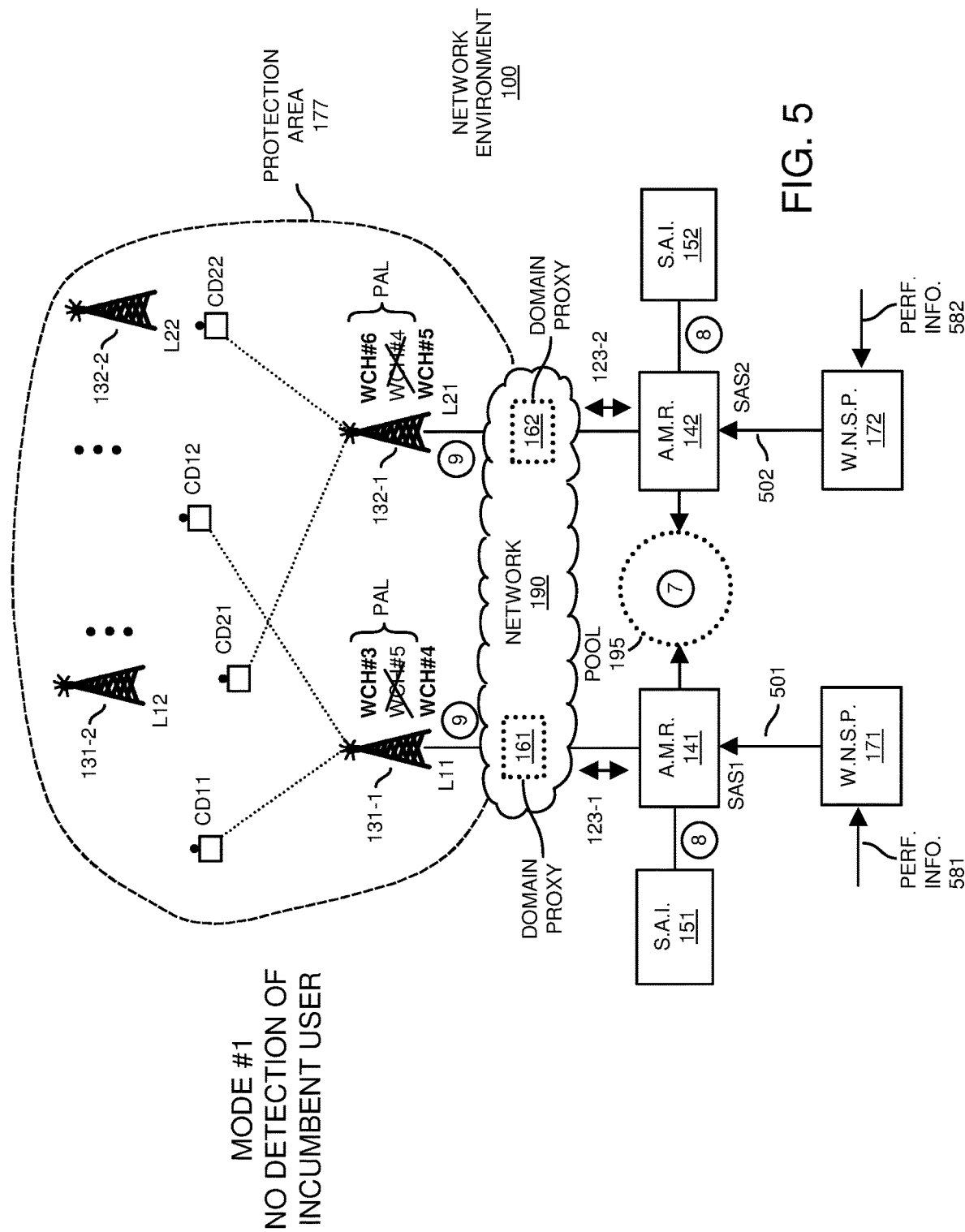
FIG. 5 is an example diagram illustrating a swap of wireless channels according to embodiments herein.

FIG. 5 is an example diagram illustrating a swap of wireless channels according to embodiments herein.

In processing operation #7, the allocation management resource 141 and allocation management resource 142 detect that the allocation of wireless channels 3 and 4 to wireless stations 131 and allocation of wireless channels 5 and 6 to wireless stations 132 satisfy the swap criteria 191 and swap criteria 192. In such an instance, in response to this condition, the allocation management resource 141 notifies the wireless network service provider 171 of the swap of wireless channels 4 and 5. The allocation management resource 142 notifies the wireless network service provider 172 of the swap of wireless channels 4 and 5.

In processing operation #8, the allocation management resource 141 updates the spectrum allocation information 151 to indicate the new assignment of wireless channel 4 to the wireless stations 131 (as a swap for wireless channel 5). The allocation management resource 142 updates the spectrum allocation information 152 to indicate the new assignment of wireless channel #5 to the wireless stations 132 (as a swap for wireless channel 4).

In processing operation #9, the allocation management resource 141 notifies the wireless stations 131 to use wireless channels 3 and 4; the allocation management resource 142 notifies the wireless stations 132 to use wireless channels 5 and 6.

In one embodiment, each of the allocation management resources (communication management resources implemented as communication management hardware, communication management software, or a combination of communication management hardware and communication management software) provides the wireless stations an evaluation timeframe in which to evaluate use of the newly assignment of wireless channels in the corresponding geographical region (such as protection area 177) in which the wireless stations reside. This ensures that the new assignment of wireless channels perform at a satisfactory level to the respective wireless network service providers.

Based on use of the newly assigned wireless channels during a trial (evaluation) period, the wireless network service providers receive performance information indicating how a respective performance of the newly assigned wireless channels.

For example, the wireless network service provider 171 receives performance information 581 (such as from the wireless stations 131 or any suitable resource). Assume that the performance information 581 indicates that the combination of wireless channels 3 and 4 assigned to the wireless stations 131 provide better performance than the wireless channels 3 and 5. In such an instance, the wireless network service provider 171 indicates a desire to keep the new assignment of wireless communication link channels rather than revert back to the old assignment of wireless channels 3 and 5 to the wireless network service provider 171 and corresponding wireless stations 131.

The wireless network service provider 172 receives performance information 582 (such as from the wireless stations 132 or any suitable resource). Assume that the performance information 582 indicates that the combination of wireless channels 5 and 6 assigned to the wireless stations 132 provide better performance than the wireless channels 4 and 6. In such an instance, the wireless network service provider 172 indicates a desire to keep the new assignment of wireless communication link channels rather than revert back to the old assignment of wireless channels 4 and 6 to the wireless network service provider 172 and corresponding wireless stations 132.

In one embodiment, the wireless network service provider 171 confirms the desire to keep the swap (as opposed to canceling) via communications 501 to the allocation management resource 141. The wireless network service provider 172 confirms the desire to keep the swap (as opposed to canceling) via communications 502 to the allocation management resource 142. In such an instance, because both wireless network service providers agree to the swap after evaluation (such as a certain duration of time), the allocation management resource 141 continues to allocate wireless channels 3 and 4 to the wireless stations 131; the allocation management resource 142 continues to allocate wireless channels 5 and 6 to the wireless stations 132.

Figure 6:
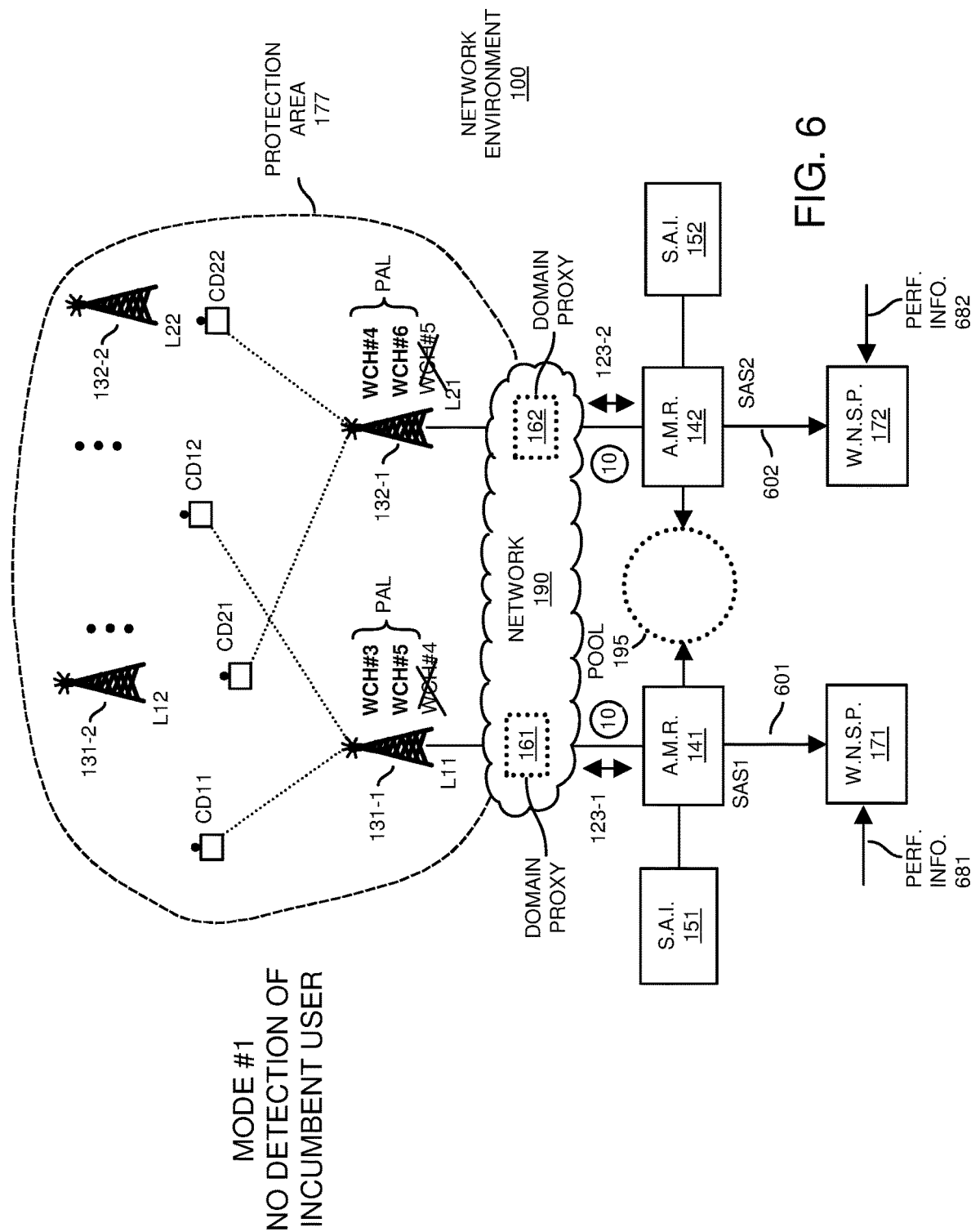
FIG. 6 is an example diagram illustrating reversion or cancelation of a swap according to embodiments herein.

FIG. 6 is an example diagram illustrating reversion or cancelation of a swap according to embodiments herein.

As an alternative to the results in FIG. 5, in one embodiment, the wireless network service provider 171 receives performance information 681 indicating that implementation of channels 3 and 4 via wireless stations 131 falls below a threshold performance level and/or that wireless channels 3 and 5 provide better performance to the wireless network service provider 171 than wireless channels 3 and 4. In such an instance, via communications 601, the wireless network service provider 171 notifies allocation management resource 141 to cancel the swap after the evaluation duration.

The wireless network service provider 171 receives performance information 682 indicating that implementation of channels 5 and 6 via wireless stations 132 falls below a threshold performance level and/or that wireless channels 4 and 6 provide better performance to the wireless network service provider 171 than wireless channels 5 and 6. In such an instance, via communications 602, the wireless network service provider 171 notifies allocation management resource 142 to cancel the swap after the evaluation duration.

In one embodiment, if either wireless network service provider 171 or wireless network service provider 172 cancels the swap, then the allocation management resources switch back to allocating wireless channels 3 and 5 to wireless stations 131 and wireless channels 4 and 6 to wireless stations 132.

Thus, in one embodiment, in response to receiving input indicating to cancel the requested swap as a result of evaluating one or more newly allocated wireless channels, the allocation management resources revoke use of the wireless channels and provides notice to the wireless stations to use the original wireless channel assignment again.

Figure 7:
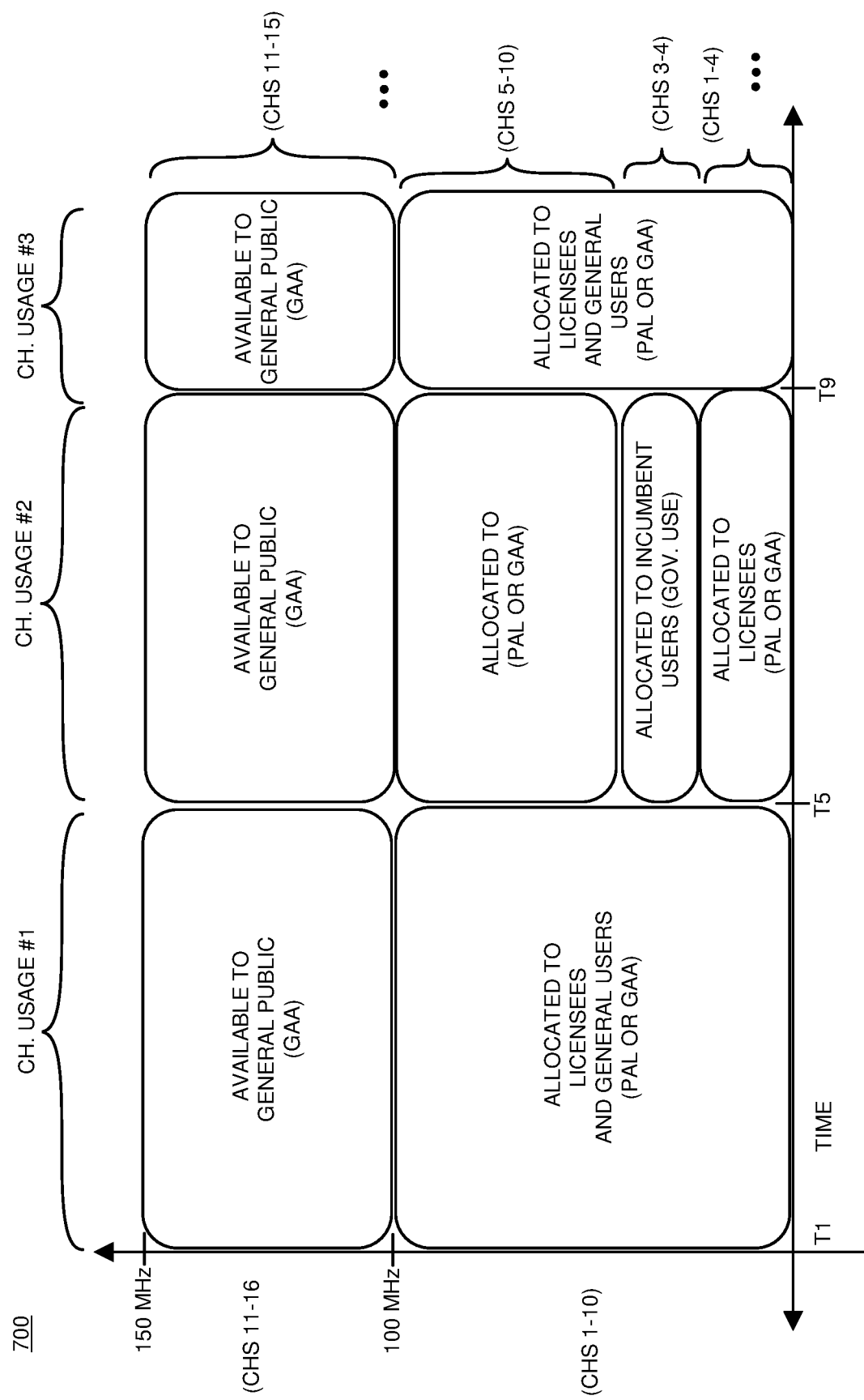
FIG. 7 is an example diagram illustrating use of the allocated wireless bandwidth to communicate between a respective wireless base station and multiple communication devices according to embodiments herein.

FIG. 7 is an example diagram illustrating use of the allocated wireless bandwidth to communicate between a respective wireless base station and multiple communication devices according to embodiments herein.

In this example embodiment, the timing diagram 700 illustrates operations executed by different entities in the wireless network environment 100.

For example, prior to time T5, in a manner as previously discussed, the wireless stations use wireless channels in a manner as previously discussed.

At or around time T5, the bandwidth monitor 140 detects use of the wireless channels 3 and 4 by the incumbent entity 490. In response to this event, the bandwidth monitor 140 transmits communications to the allocation management resources 141, 142, etc., indicating incumbent use of the wireless channels 3 and 4.

During incumbent use of the wireless channels 3 and 4 between time T5 and T9, the wireless stations are unable to use wireless channels 3 and 4. At such time, the allocation management resources revoke use of the wireless channels 3 and 4.

After time T9, the incumbent entity discontinues use of the wireless channels 3 and 4. In such an instance, the allocation management resources allocate the wireless channels 3 and 4 again to the wireless stations.

Figure 8:
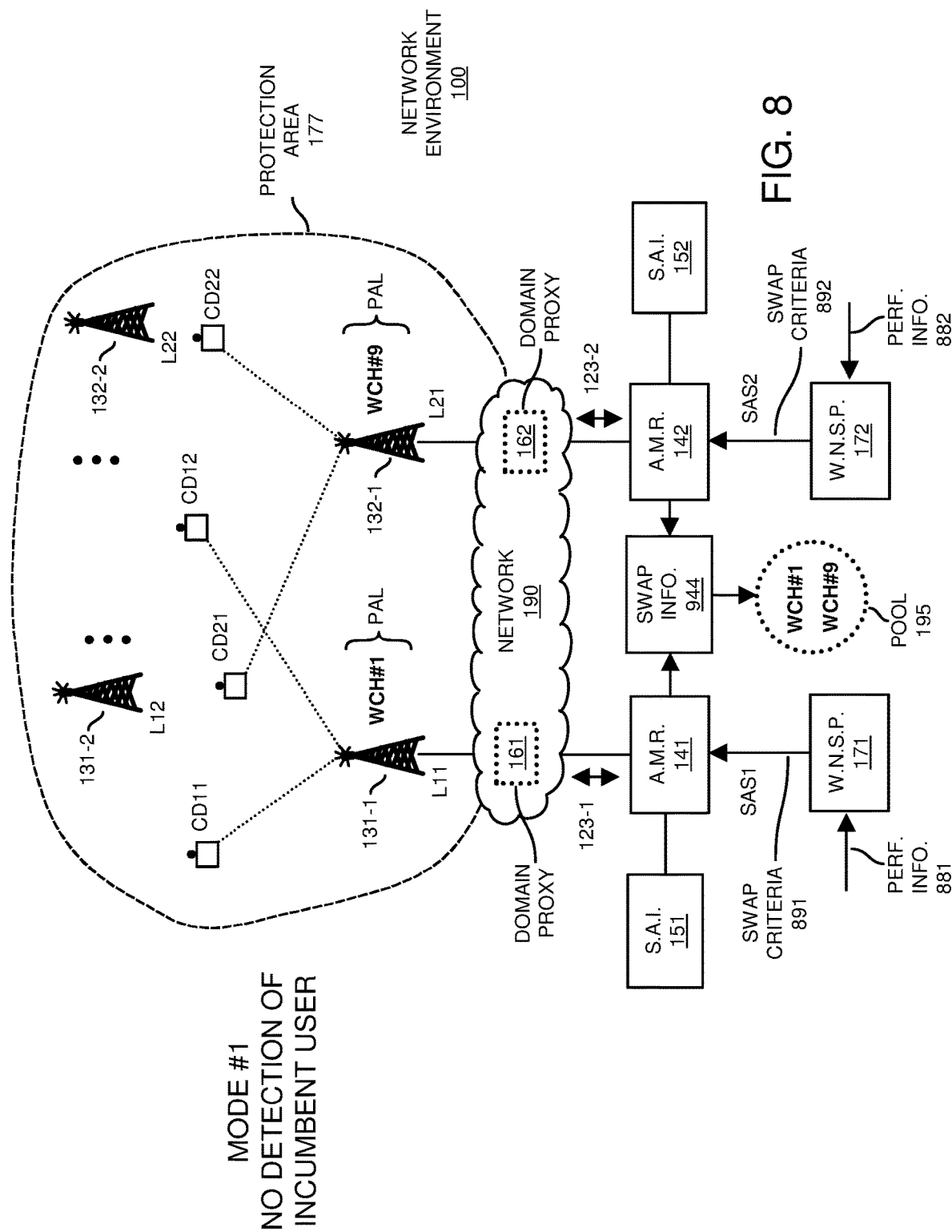
FIG. 8 is an example diagram illustrating registration of swap requests according to embodiments herein.

FIG. 8 is an example diagram illustrating registration of swap requests according to embodiments herein.

In this example embodiment, in a similar manner as previously discussed, the wireless stations 131 register with allocation management resource 141 for use of wireless channels; the allocation management resource 141 allocates use of wireless channel #1 to support wireless communications. The wireless stations 132 register with allocation management resource 142 for use of wireless channels; the allocation management resource 142 allocates use of wireless channel #9 to support wireless communications.

In further example embodiments, the wireless network service provider 171 operating wireless stations 131 receives performance information 881 indicating performance associated with wireless station 131 using wireless channel 1 to support communications with the communication devices CD11, CD12, etc. The wireless network service provider 172 operating wireless stations 132 receives performance information 882 indicating a performance associated with use of wireless channel 9 to support communications with the communication devices CD21, CD22, etc.

Assume in this example embodiment that each of wireless network service providers would like a wireless channel of a different carrier frequency.

For example, assume that the performance information 881 indicates that wireless channel 1 does not provide a level of quality (such as bit transmission rate) above a threshold value desired by the wireless network service provider 171. In such an instance, either based on the performance information 881 or any other reason, the wireless network service provider 171 produces swap criteria 891 requesting a wireless channel of a higher carrier frequency than wireless channel 1. In one embodiment, the swap criteria 891 also indicates that wireless channel 1 is available for the swap.

Assume that the performance information 882 indicates that wireless channel 9 does not provide a level of quality (such as bit transmission rate) above a threshold value desired by the wireless network service provider 172. In such an instance, either based on the performance information 882 or any other reason, the wireless network service provider 172 produces swap criteria 892 requesting a wireless channel of a lower carrier frequency than wireless channel 9. In one embodiment, the swap criteria 892 also indicates that wireless channel 9 is available for the swap.

FIG. 9 is an example diagram illustrating swap information according to embodiments herein.

In this example embodiment, one or more of the allocation management resources produce and keep track of swap information 944 based on the received swap criteria 891, 892, etc.

For example, in one embodiment, swap information 944 includes registration of the requested swaps such as an identity of wireless network service providers (171, 172, etc.) requesting swaps, a corresponding geographical region (such as protection area 177) to which the wireless channels are licensed for use, the wireless channels available for swap, swap criteria, etc.

The swap information 944 serves as a basis in which the allocation management resources attempt to negotiate a swap of one or more wireless channels with one or more other allocation management resources.

In one embodiment, the swap information 944 indicates swap requests associated with the region of wireless coverage (such as protection area 177) in which multiple wireless network service providers provide wireless connectivity to respective communication devices.

Figure 10:
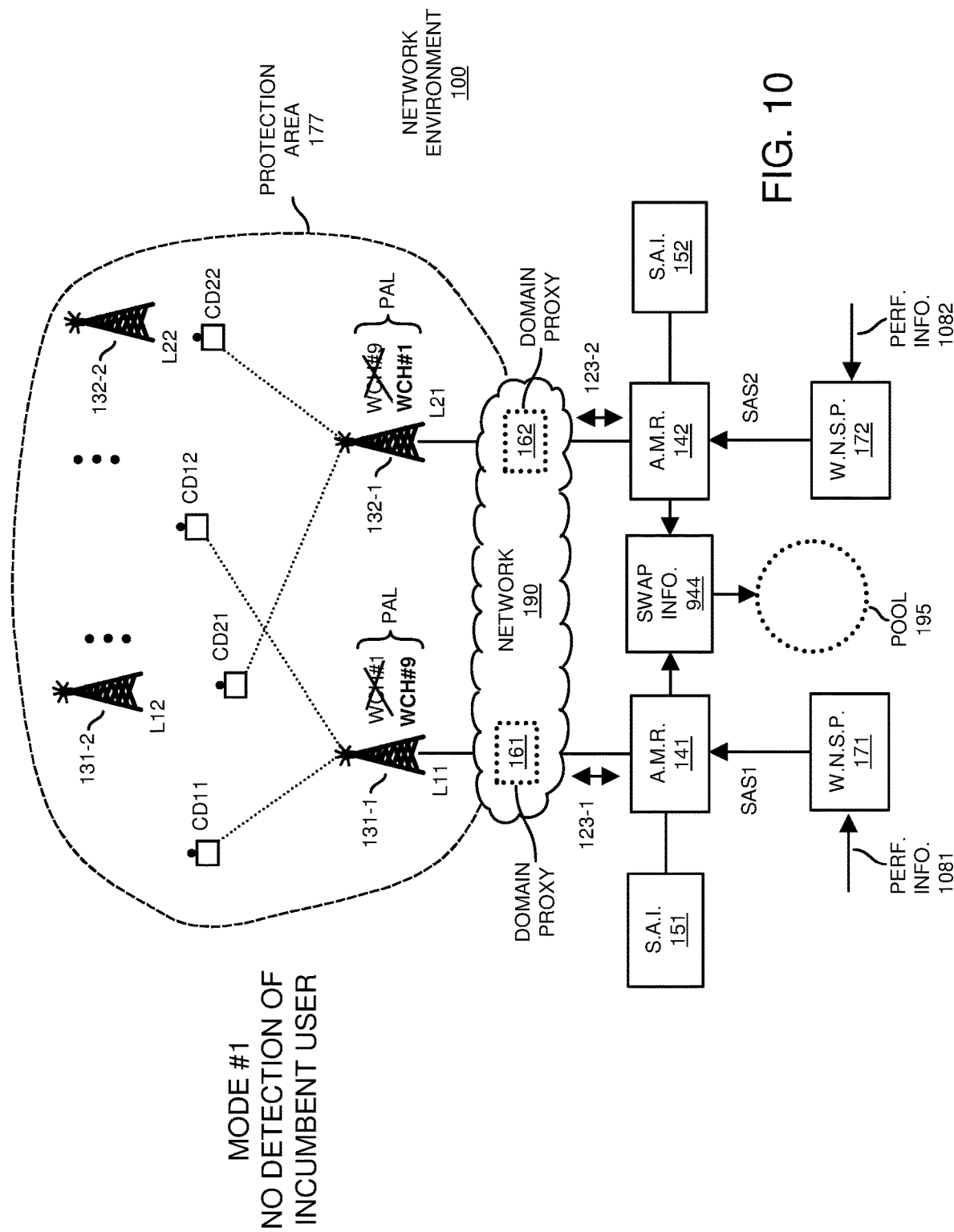
FIG. 10 is an example diagram illustrating execution of a swap of wireless channels according to embodiments herein.

FIG. 10 is an example diagram illustrating execution of a swap of wireless channels according to embodiments herein.

As previously discussed, the swap information 944 defines a pool of candidate wireless channels potentially available for swap if respective swap criteria is met for both entities participating in a respective swap.

In this example embodiment, the wireless channels 1 and 9 are candidate wireless channels in pool 195 for a possible swap.

Assume in this example embodiment that the allocation management resource 141 and allocation management resource 142 detect that the reallocation of wireless channel 9 to wireless stations 131 and reallocation of wireless channel 1 to wireless stations 132 satisfy the swap criteria 891 and swap criteria 892. In such an instance, in response to this condition, the allocation management resource 141 notifies the wireless network service provider 171 of the swap of wireless channel 1 for wireless channel 9. In other words, the allocation management resource 141 allocates and notifies the wireless stations 131 use of wireless channel 9 as a substitute to wireless channel 1.

Additionally, in response to this condition, the allocation management resource 142 notifies the wireless network service provider 172 of the swap of wireless channel 9 for wireless channel 1. In other words, the allocation management resource allocates the wireless stations 132 use of wireless channel 1 as a substitute to wireless channel 9.

In response to the swap, the allocation management resource 141 updates the spectrum allocation information 151 to indicate the new assignment of wireless channel 9 to the wireless stations 131 and wireless network service provider 171 (as a swap for wireless channel 1). The allocation management resource 142 updates the spectrum allocation information 152 to indicate the new assignment of wireless channel 1 to the wireless stations 132 and wireless network service provider 172 (as a swap for wireless channel 9).

In a manner as previously discussed, if desired, each of the allocation management resources provides the wireless stations an evaluation timeframe in which to evaluate use of the newly assignment of wireless channels in the corresponding geographical region (such as protection area 177) in which the wireless stations reside. This ensures that the new assignment of wireless channels perform at a satisfactory level to the respective wireless network service providers.

In one embodiment, wireless network service provider 171 receives performance information 1081 associated with use of wireless channel 9 during evaluation period. Wireless network service provider 172 receives performance information 1081 associated with use of wireless channel 1 during the value period.

If both of the wireless network service providers agree to maintain the swap after evaluation such as via respective communications from the wireless network service providers to the allocation management resources, then the swap becomes permanent. Alternatively, if either of the wireless network service providers decides to cancel the swap and send communications to the allocation management resources indicating same, the swap is canceled and the wireless network service providers are allocated there old wireless channels. For example, if the swap is canceled, the allocation management resource 141 reallocates original channel assignment information such as use of the wireless channel 1 to wireless stations 131; the allocation management resource 142 allocates use of the wireless channel 9 to the wireless stations 132.

Figure 11:
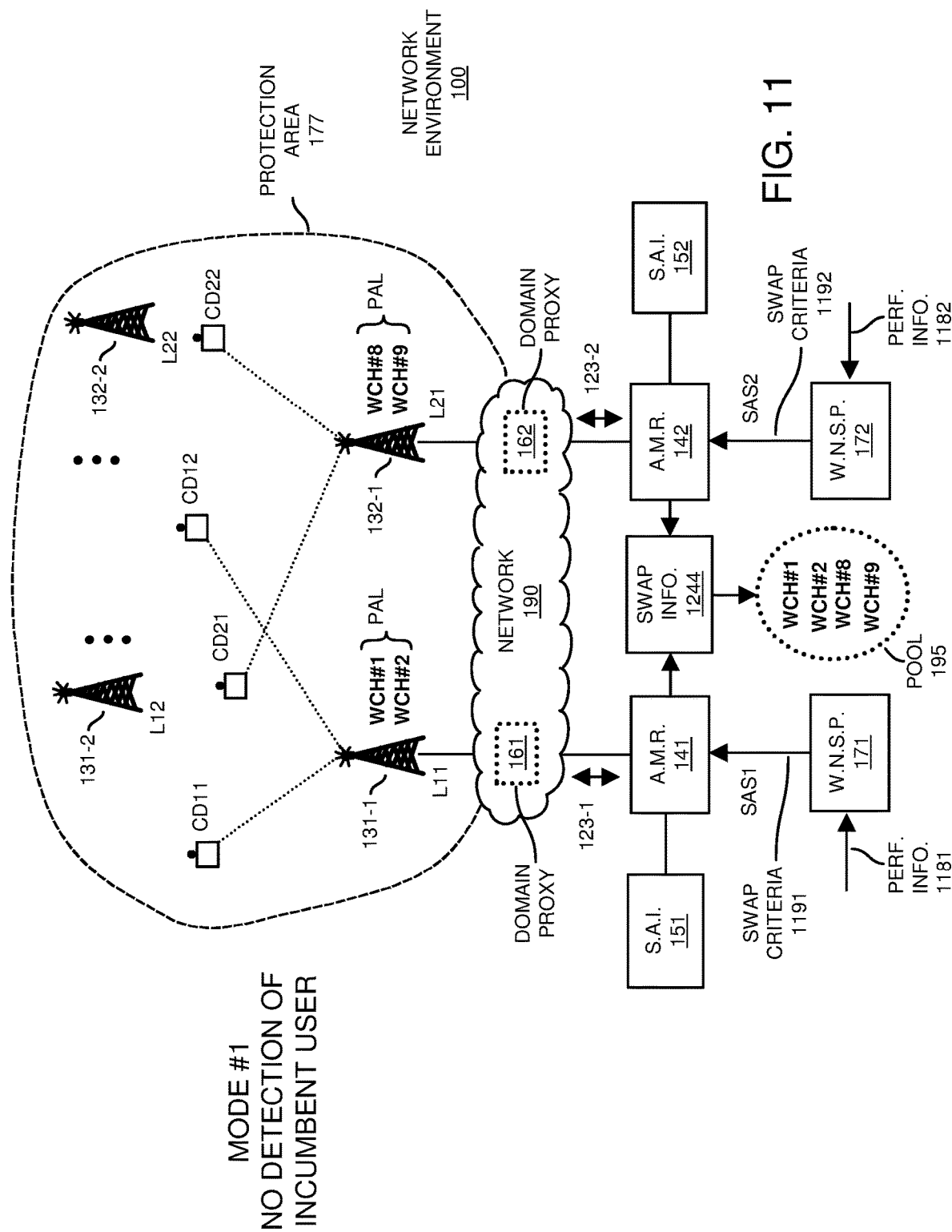
FIG. 11 is an example diagram illustrating registration of swap requests according to embodiments herein.

FIG. 11 is an example diagram illustrating registration of swap requests according to embodiments herein.

In a similar manner as previously discussed, the wireless stations 131 register with allocation management resource 141 for use of wireless channels; the allocation management resource 141 initially allocates use of wireless channels 1 and 2 to support corresponding wireless communications with respective communication devices.

The wireless stations 132 register with allocation management resource 142 for use of wireless channels; the allocation management resource 142 initially allocates use of wireless channels 8 and 9 to support corresponding wireless communications with respective communication devices.

In further example embodiments, the wireless network service provider 171 operating wireless stations 131 receives performance information 1181 indicating performance associated with use of initially allocated wireless channels 1 and 2. The wireless network service provider 172 operating wireless stations 132 receives performance information 1182 indicating a performance associated with use of initiate allocated wireless channels 8 and 9.

Assume in this example embodiment that each of wireless network service providers would like wireless channel of different carrier frequencies such as based on detect poor performance of the initially assigned wireless channels.

For example, assume that the performance information 1181 indicates that wireless channels 1 and 2 do not provide a level of quality (such as bit transmission rate) above a threshold value desired by the wireless network service provider 171. In such an instance, either based on the performance information 1181 or any other reason, the wireless network service provider 171 produces swap criteria 1191 requesting contiguous wireless channels of a higher frequency than wireless channels 1 and 2. In one embodiment, the swap criteria 1191 also indicates that wireless channels 1 and 2 are available for the swap.

Assume that the performance information 1182 indicates that wireless channels 8 and 9 do not provide a level of quality (such as bit transmission rate) above a threshold value desired by the wireless network service provider 172. In such an instance, either based on the performance information 1182 or any other reason, the wireless network service provider 172 produces swap criteria 1192 requesting wireless channels of a lower frequency than wireless channels 8 and 9. In one embodiment, the swap criteria 1192 also indicates that wireless channels 8 and 9 are available for the swap.

Pool 195 indicates channel swap candidates.

FIG. 12 is an example diagram illustrating swap information according to embodiments herein.

In this example embodiment, one or more of the allocation management resources produce and keep track of swap information 1244 based on the received swap criteria 1191, 1192, etc.

For example, in one embodiment, swap information 1244 includes registration of the requested swaps such as an identity of wireless network service providers (171, 172, etc.) requesting swaps, a corresponding geographical region (such as protection area 177) to which the wireless channels are licensed for use, the wireless channels available for swap, swap criteria (1191, 1192, etc.), etc.

As previously discussed, the swap information 1244 serves as a basis in which the allocation management resources create a pool 195 of channels available for swapping. The allocation management resources attempt to negotiate a swap of one or more wireless channels with one or more other allocation management resources based on the swap information 1244.

Figure 13:
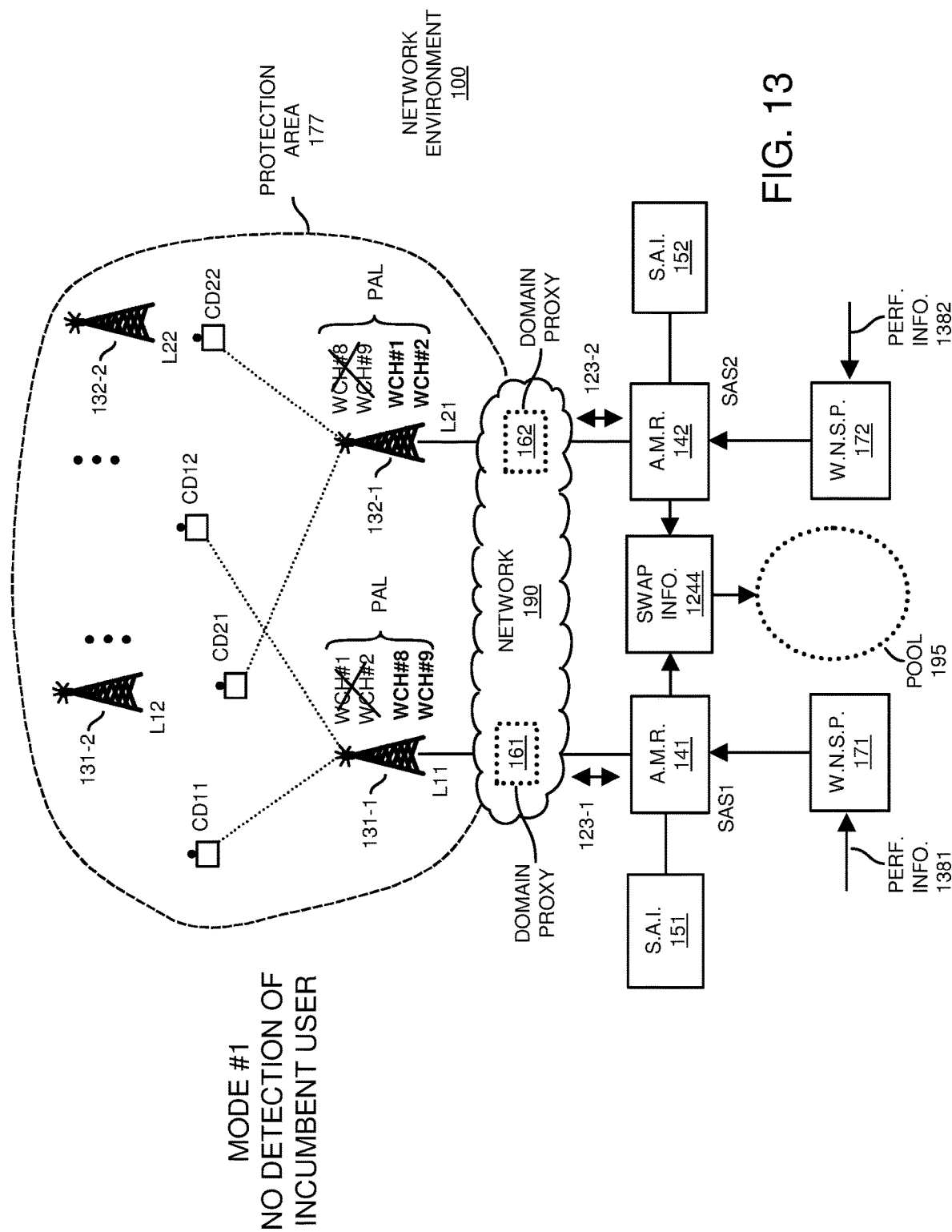
FIG. 13 is an example diagram illustrating execution of a swap of wireless channels according to embodiments herein.

FIG. 13 is an example diagram illustrating execution of a swap of wireless channels according to embodiments herein.

As previously discussed, the swap information 1244 defines a pool of candidate wireless channels potentially available for swap if respective swap criteria is met for two or more entities participating in a respective swap.

In this example embodiment, the wireless channels 1, 2, 8, and 9 are candidate wireless channels in pool 195 for a possible swap.

Assume further in this example embodiment that the allocation management resource 141 and allocation management resource 142 detect that the reallocation of wireless channels 8 and 9 to wireless stations 131 and allocation of wireless channels 1 and 2 to wireless stations 132 satisfy the swap criteria 1191 (associated with wireless network service provider 171) and swap criteria 1192 (associated with wireless network service provider 172).

In such an instance, in response to this condition, the allocation management resource 141 notifies the wireless network service provider 171 of the swap of wireless channels 1 and 2 for wireless channels 8 and 9. In other words, the allocation management resource 141 allocates and notifies the wireless stations 131 use of wireless channels 8 and 9 as a substitute to wireless channels 1 and 2.

Additionally, in response to this condition, the allocation management resource 142 notifies the wireless network service provider 172 of the swap of wireless channels 8 and 9 for wireless channels 1 and 2. In other words, the allocation management resource 142 allocates the wireless stations 132 use of wireless channel 1 and 2 as a substitute to wireless channels 8 and 9.

In response to the swap, the allocation management resource 141 updates the spectrum allocation information 151 to indicate the new assignment (at least temporary) of wireless channels 8 and 9 to the wireless stations 131 (as a swap for wireless channels 1 and 2). The allocation management resource 142 updates the spectrum allocation information 152 to indicate the new assignment of wireless channels 1 and 2 to the wireless stations 132 (as a swap for wireless channels 8 and 9).

In a similar manner as previously discussed, if desired, each of the allocation management resources provides the wireless stations an evaluation timeframe in which to evaluate use of the newly assignment of wireless channels in the corresponding geographical region (such as protection area 177) in which the wireless stations reside. This ensures that the new assignment of wireless channels perform at a satisfactory level to the respective wireless network service providers.

If both of the wireless network service providers agree to maintain the swap after evaluation timeframe, then the swap becomes permanent. Alternatively, if either of the wireless network service providers decides to cancel the swap such as within a respective evaluation timeframe, the swap is canceled and the wireless network service providers are allocated there old wireless channels again. For example, if the swap is canceled, the allocation management resource 141 revokes wireless channels 8 and 9 from the wireless stations 131 and reallocates use of the wireless channels 1 and 2 to wireless stations 131; the allocation management resource 142 revokes the wireless channels 1 and 2 and reallocates use of the wireless channel 8 and 9 to the wireless stations 132.

Figure 14:
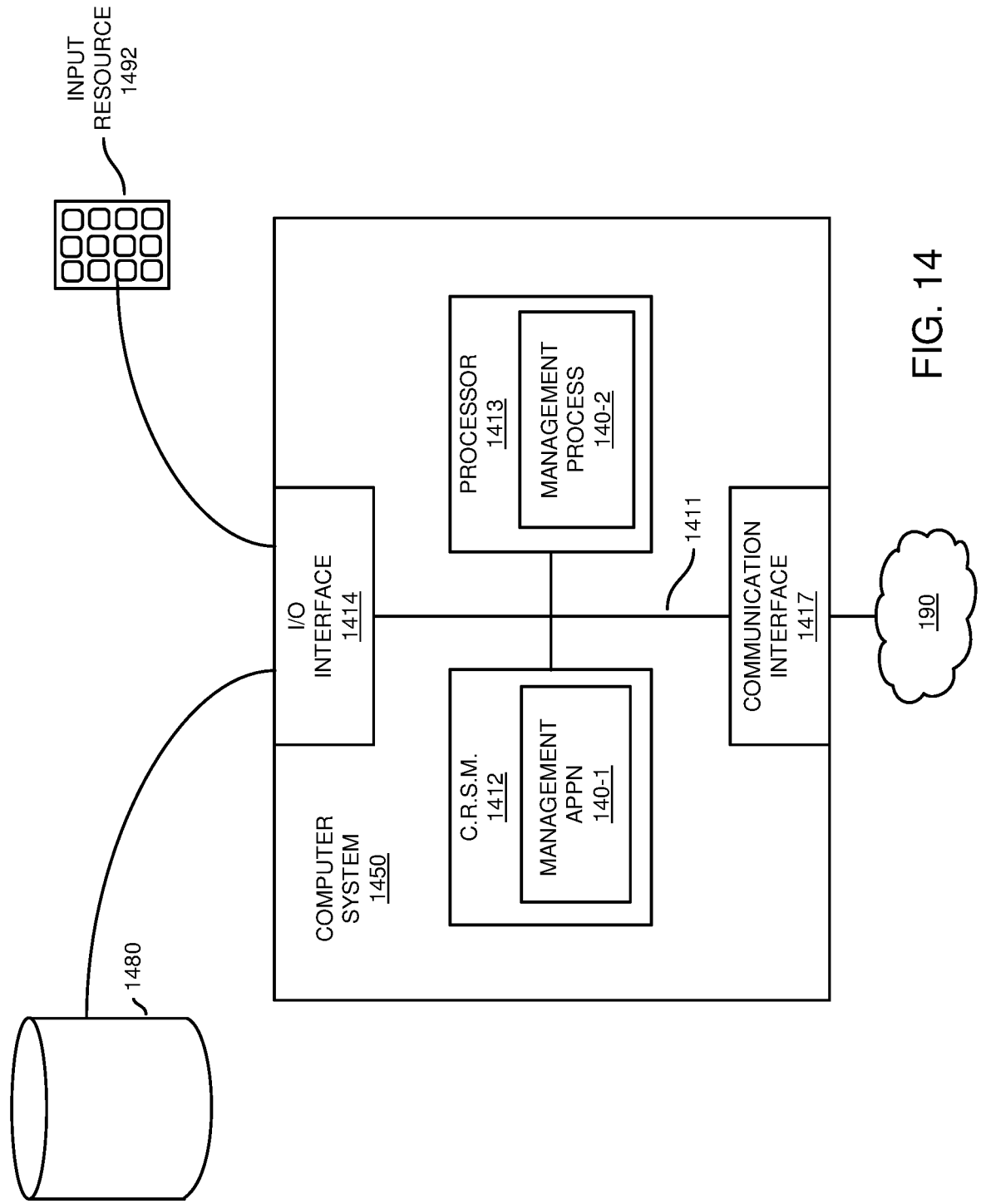
FIG. 14 is an example diagram illustrating example computer architecture operable to execute one or more operations according to embodiments herein.

FIG. 14 is an example block diagram of a computer system for implementing any of the operations as previously discussed according to embodiments herein.

Any of the resources (such as wireless network service provider, mobile communication devices, wireless access points, wireless stations, wireless base stations, communication management resource, bandwidth management resource, communication management resources, bandwidth monitor, allocation management resource, etc.) as discussed herein can be configured to include computer processor hardware and/or corresponding executable instructions to carry out the different operations as discussed herein.

As shown, computer system 1450 of the present example includes an interconnect 1411 that coupling computer readable storage media 1412 such as a non-transitory type of media (which can be any suitable type of hardware storage medium in which digital information can be stored and retrieved), a processor 1413 (computer processor hardware), I/O interface 1414, and a communications interface 1417.

I/O interface(s) 1414 supports connectivity to repository 1480 and input resource 1492.

Computer readable storage medium 1412 can be any hardware storage device such as memory, optical storage, hard drive, floppy disk, etc. In one embodiment, the computer readable storage medium 1412 stores instructions and/or data.

As shown, computer readable storage media 1412 can be encoded with management application 131-1 (e.g., including instructions) to carry out any of the operations as discussed herein.

During operation of one embodiment, processor 1413 accesses computer readable storage media 1412 via the use of interconnect 1411 in order to launch, run, execute, interpret or otherwise perform the instructions in management application 140-1 stored on computer readable storage medium 1412. Execution of the management application 140-1 (such as communication management resource) produces management process 140-2 to carry out any of the operations and/or processes as discussed herein.

Those skilled in the art will understand that the computer system 1450 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1950 may reside at any location or can be included in any suitable resource in any network environment to implement functionality as discussed herein.

Functionality supported by the different resources will now be discussed via flowcharts in FIG. 15. Note that the steps in the flowcharts below can be executed in any suitable order.

Figure 15:
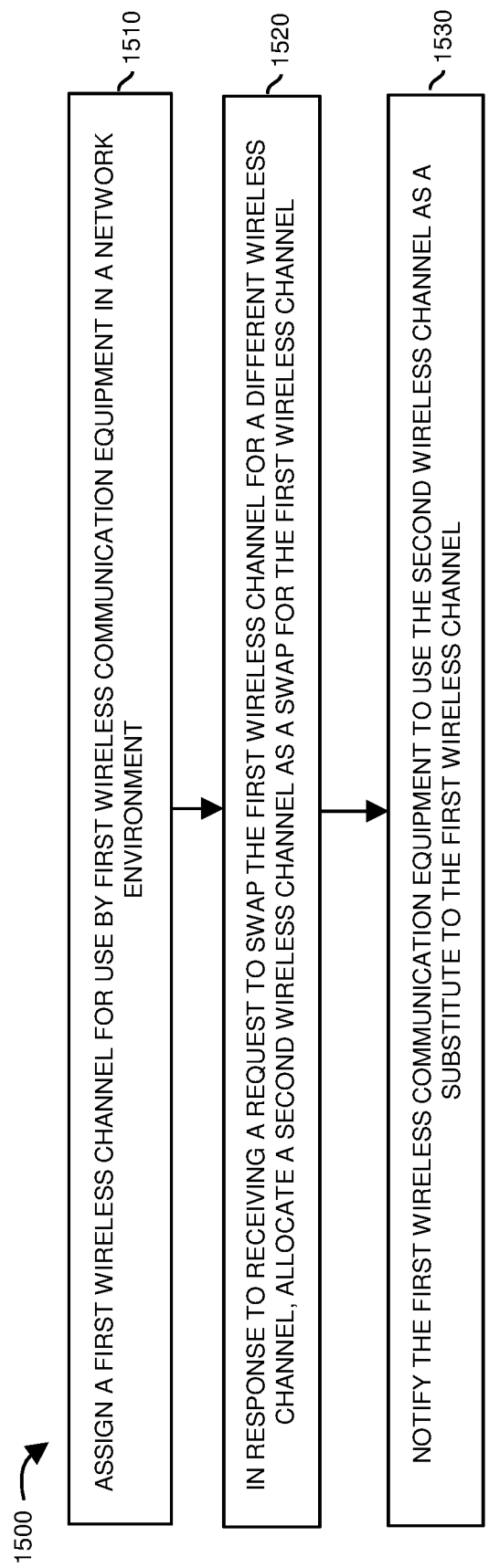
FIG. 15 is an example diagram illustrating a method according to embodiments herein.

FIG. 15 is a flowchart 1500 illustrating an example method according to embodiments. Note that there will be some overlap with respect to concepts as discussed above.

In processing operation 1510, an allocation management resource assigns a first wireless channel for use by first wireless communication equipment (such as wireless stations 131) in a network environment 100.

In processing operation 1520, in response to receiving a request to swap the first wireless channel for a different wireless channel, the allocation management resource allocates a second wireless channel as a swap for the first wireless channel.

In processing operation 1530, the allocation management resource notifies the first wireless communication equipment to use the second wireless channel as a substitute to the first wireless channel.

Further Example Embodiments

A wireless network service provider holds one or more priority access licenses (PAL); other operators hold other PAL licenses. PAL licenses are allocated for use in specific geographical regions. A single wireless network service provider can hold PAL licensed at the same location. As previously discussed, the PAL spectrum is 10 MHz and each 10 MHz wireless channel can be assigned from a different frequency range between 3550-3650 MHz. In certain instances, a 10 MHz channel in 3550-3560 MHz band (lower channels) is more desirable than 10 MHz spectrum in 3640-3650 MHz (upper channels).

As previously discussed, a 10 MHz assigned to an operator (wireless network service provider) may not serve the operator's needs. For example, lower frequency ranges can reach to further distances and more suitable to serve operator's with coverage concern. Certain wireless channels may be susceptible to interference when used in particular geographical region, while others may be interference free. Similarly, higher frequency ranges reach shorter distance however provide better capacity and therefore it will serve operators with capacity needs much better.

System Operations:
1—Operator 1 (wireless network service provider 171) is assigned 10 MHz PAL spectrum by SAS (Spectrum Access System) at location A,
2—Operator 2 (wireless network service provider 172) is assigned 10 MHz PAL spectrum by SAS at location A, 3—Operator 1 needs lower spectrum range (lower carrier frequency) because operator 2 serves a small number of CBSDs, 4—Operator 2 needs higher spectrum range because operator 2 serves a higher number of CBSDs, and serving hotspots, 5—Operator 1 registers with SAS as frequency swap candidate, and operator 2 registers with SAS as frequency swap candidate, 6—Operator 1 sends 'frequency swap' request to the SAS in order to swap the PAL spectrum with another operator willing to swap, 7—SAS checks its database to check if any swap candidate is willing to perform swap, 8—SAS finds operator 2 as swap candidate and sends request to operator 2, 9—Operator 2 confirms the frequency swap, 10—SAS assigns operator 2's spectrum to operator 1, 11—SAS assigns operator 1's spectrum to operator 2, 12—Swap candidate can be determined based on;
   a. Coverage needs of an operator,
   b. Capacity needs of an operator,
   c. User density at a location,
   d. Number of base stations at a location Note again that techniques herein are well suited to facilitate improved wireless communication in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
assigning a first wireless channel for use by first wireless communication equipment in a network environment;
receiving a request to swap the first wireless channel for a different wireless channel based on a performance of the first wireless channel to convey communications;
in response to receiving the request to swap the first wireless channel for the different wireless channel, allocating a second wireless channel as a swap for the first wireless channel; and
notifying the first wireless communication equipment to use the second wireless channel as a substitute to the first wireless channel.

2. The method as in claim 1 further comprising:
receiving the request from the first wireless communication equipment.

3. The method as in claim 1 further comprising:
providing the first wireless communication equipment an evaluation timeframe in which to evaluate use of the second wireless channel in a particular region.

4. The method as in claim 3 further comprising:
in response to receiving input indicating to cancel the swap as a result of evaluating the second wireless channel: revoking use of the second wireless channel and providing notice to the first wireless communication equipment to use the first wireless channel.

5. The method as in claim 3 further comprising:
in response to receiving input indicating to accept the swap as a result of evaluating the second wireless channel: providing notice to the first wireless communication equipment to continue use of the first wireless channel.

6. The method as in claim 1 further comprising:
assigning the second wireless channel for use by second wireless communication equipment in the network environment;
in response to receiving a request to swap the second wireless channel for a different wireless channel, allocating the first wireless channel to the second wireless communication equipment as a swap for the second wireless channel; and
notifying the second wireless communication equipment to use the first wireless channel as a substitute to the second wireless channel.

7. The method as in claim 6, wherein the first wireless communication equipment is operated by a first wireless network service provider granted a license to use the first wireless channel; and
wherein the second wireless communication equipment is operated by a second wireless network service provider granted a license to use the second wireless channel.

8. The method as in claim 1, wherein the request is a first swap request, the method further comprising:

identifying a geographical region in which the first wireless channel is initially assigned for use by the first wireless communication equipment; and
using the geographical region to map the first swap request to a second swap request, the second swap request requesting a swap of the second wireless channel with a different wireless channel.

9. The method as in claim 1, wherein the request to swap indicates a desire to swap the first wireless channel with a wireless channel of a higher carrier frequency than the first wireless channel; and
wherein the second wireless channel has a higher carrier frequency than the first wireless channel.

10. The method as in claim 1, wherein the request specifies frequency attributes of the different wireless channel.

11. The method as in claim 1, wherein notifying the first wireless communication equipment to use the second wireless channel as the substitute to the first wireless channel includes:
transmitting a wireless communication over a wireless communication link to the first wireless communication equipment, the wireless communication indicating to use the second wireless channel as a replacement to the first wireless channel.

12. The method as in claim 1, wherein the request is a first request, the method further comprising:
subsequent to receiving the first request, and prior to allocating the second wireless channel as a swap for the first wireless channel:
i) receiving a second request to swap the second wireless channel with a different wireless channel; and
ii) comparing swap criteria associated with the first request to swap criteria associated with the second request.

13. The method as in claim 1 further comprising:
receiving the request to swap the first wireless channel for the different wireless channel in response to a condition in which the performance of the first wireless channel to convey the communications is detected as being below a threshold level.

14. The method as in claim 1, wherein the performance indicates an inability of the first wireless channel to convey the communications over a wireless communication link between the first wireless communication equipment and a wireless station.

15. The method as in claim 1 further comprising:
storing an identity of the first wireless channel in a pool in response to receiving the request, the pool indicating that the second wireless channel is available for a swap.

16. The method as in claim 15, wherein allocating the second wireless channel as the swap for the first wireless channel includes:
selecting the second wireless channel from the pool.

17. The method as in claim 16, wherein the second wireless channel is included in the pool in response to second wireless communication equipment requesting to swap the second wireless channel for a different wireless channel.

18. The method as in claim 17 further comprising:
allocating the first wireless channel in the pool to the second wireless communication equipment.

19. The method as in claim 1, wherein the second wireless channel provides a higher bit rate of conveying communications between the first wireless communication equipment and a wireless base station than the first wireless channel.

20. The method as in claim 1, wherein the second wireless channel is allocated as a swap for the first wireless channel during a condition in which an incumbent entity having higher priority rights than the first wireless communication equipment does not use the first wireless channel.

21. The method as in claim 1, wherein the second wireless channel is available for allocation to the first wireless communication equipment in response to a condition in which the second wireless channel provides wireless connectivity performance to second wireless communication equipment below a threshold level.

22. The method as in claim 1, wherein the request includes criteria specifying attributes of the different wireless channel requested by the first wireless communication equipment as a swap for the first wireless channel.

23. The method as in claim 22, wherein the criteria indicate a contiguous set of wireless channels desired for allocation to the first wireless communication equipment.

24. A method comprising:
assigning a first wireless channel for use by first wireless communication equipment in a network environment;
in response to receiving a request to swap the first wireless channel for a different wireless channel, allocating a second wireless channel as a swap for the first wireless channel;
notifying the first wireless communication equipment to use the second wireless channel as a substitute to the first wireless channel;
determining a set of candidate wireless channels in which to swap the first wireless channel based on a location in which the first wireless channel is licensed for use by the first wireless communication equipment; and
selecting the second wireless channel from the set.

25. A system comprising:
communication management hardware operative to:
assign a first wireless channel for use by first wireless communication equipment in a network environment;
receiving a request to swap the first wireless channel for a different wireless channel based on a performance of the first wireless channel to convey communications;
in response to receiving the request to swap the first wireless channel for the different wireless channel, allocate a second wireless channel as a swap for the first wireless channel; and
notify the first wireless communication equipment to use the second wireless channel as a substitute to the first wireless channel.

26. The system as in claim 25, wherein the communication management hardware is further operative to:
receive the request from the first wireless communication equipment.

27. The system as in claim 25, wherein the communication management hardware is further operative to:
provide the first wireless communication equipment an evaluation timeframe in which to evaluate use of the second wireless channel in a particular region.

28. The system as in claim 27, wherein the communication management hardware is further operative to:
in response to receiving input indicating to cancel the swap as a result of evaluating the second wireless channel: revoke use of the second wireless channel and providing notice to the first wireless communication equipment to use the first wireless channel.

29. The system as in claim 27, wherein the communication management hardware is further operative to:

in response to receiving input indicating to accept the swap as a result of evaluating the second wireless channel: provide notice to the first wireless communication equipment to continue use of the first wireless channel.

30. The system as in claim 25, wherein the communication management hardware is further operative to:
assign a second wireless channel for use by second wireless communication equipment in the network environment;
in response to receiving a request to swap the second wireless channel for a different wireless channel, allocate the first wireless channel to the second wireless communication equipment as a swap for the second wireless channel; and
notify the second wireless communication equipment to use the first wireless channel as a substitute to the second wireless channel.

31. The system as in claim 30, wherein the first wireless communication equipment is operated by a first wireless network service provider granted a license to the first wireless channel; and
wherein the second wireless communication equipment is operated by a second wireless network service provider granted a license to the second wireless channel.

32. The system as in claim 25, wherein the request is a first swap request; and
wherein the communication management hardware is further operative to:
identify a geographical region in which the first wireless channel is initially assigned for use by the first wireless communication equipment; and
use the geographical region to map the first swap request to a second swap request, the second swap request requesting a swap of the second wireless channel with a different wireless channel.

33. The system as in claim 25, wherein the request to swap indicates a desire to swap the first wireless channel with a wireless channel of a higher carrier frequency than the first wireless channel; and
wherein the second wireless channel has a higher carrier frequency than the first wireless channel.

34. The system as in claim 25, wherein the request specifies frequency attributes of the different wireless channel.

35. The system as in claim 25, wherein the communication management hardware is further operative to:
transmit a wireless communication over a wireless communication link to the first wireless communication equipment, the wireless communication indicating to use the second wireless channel as a replacement to the first wireless channel.

36. The system as in claim 25, wherein the communication management hardware is further operative to:
determine a set of candidate wireless channels in which to swap the first wireless channel based on a location in which the first wireless channel is licensed for use by the first wireless communication equipment; and
select the second wireless channel from the set.

37. The system as in claim 25, wherein the request is a first request;
wherein the communication management hardware is further operative to:
subsequent to receiving the first request, and prior to allocating the second wireless channel as a swap for the first wireless channel:
i) receive a second request to swap the second wireless channel with a different wireless channel; and
ii) compare swap criteria associated with the first request to swap criteria associated with the second request.

38. Computer-readable storage hardware having instructions stored thereon, the instructions, when carried out by computer processor hardware, cause the computer processor hardware to:
assign a first wireless channel for use by first wireless communication equipment in a network environment;
receive a request to swap the first wireless channel for a different wireless channel based on a performance of the first wireless channel to convey communications;
in response to receiving the request to swap the first wireless channel for the different wireless channel, allocate a second wireless channel as a swap for the first wireless channel; and
notify the first wireless communication equipment to use the second wireless channel as a substitute to the first wireless channel.

\* \* \* \* \*